United States Patent
Tantiprasut

(10) Patent No.: US 8,533,608 B1
(45) Date of Patent: Sep. 10, 2013

(54) RUN-BOOK AUTOMATION PLATFORM WITH ACTIONABLE DOCUMENT

(75) Inventor: Thanes Tantiprasut, San Clemente, CA (US)

(73) Assignee: Generation E Consulting, Downers Grove, IL (US)

( * ) Notice: Subject to any disclaimer, the term of this patent is extended or adjusted under 35 U.S.C. 154(b) by 182 days.

(21) Appl. No.: 12/826,554

(22) Filed: Jun. 29, 2010

Related U.S. Application Data

(60) Provisional application No. 61/269,836, filed on Jun. 29, 2009.

(51) Int. Cl.
 *G06F 3/00* (2006.01)
(52) U.S. Cl.
 USPC ............................................. 715/751
(58) Field of Classification Search
 USPC ............................................. 715/751
 See application file for complete search history.

(56) References Cited

U.S. PATENT DOCUMENTS

| | | | |
|---|---|---|---|
| 5,870,717 A * | 2/1999 | Wiecha | 705/26.81 |
| 6,134,552 A | 10/2000 | Fritz et al. | |
| 6,601,232 B1 * | 7/2003 | Burba et al. | 717/100 |
| 6,615,240 B1 * | 9/2003 | Sullivan et al. | 709/205 |
| 6,999,990 B1 * | 2/2006 | Sullivan et al. | 709/205 |
| 7,069,592 B2 | 6/2006 | Porcari | |
| 7,219,107 B2 | 5/2007 | Beringer | |
| 7,313,558 B2 | 12/2007 | Akazawa et al. | |
| 7,328,186 B2 | 2/2008 | Brattain et al. | |
| 7,536,405 B2 | 5/2009 | Tschiegg et al. | |
| 7,610,575 B2 * | 10/2009 | Sproule | 717/103 |
| 7,831,635 B2 * | 11/2010 | Brothers et al. | 707/803 |
| 7,921,335 B2 * | 4/2011 | Kiefer et al. | 714/46 |
| 8,112,710 B2 * | 2/2012 | Cheng et al. | 715/704 |
| 2002/0049749 A1 * | 4/2002 | Helgeson et al. | 707/3 |
| 2002/0180789 A1 * | 12/2002 | Guttmann et al. | 345/760 |
| 2002/0184068 A1 * | 12/2002 | Krishnan et al. | 705/8 |
| 2003/0046639 A1 * | 3/2003 | Fai et al. | 715/513 |
| 2005/0065903 A1 | 3/2005 | Zhang et al. | |
| 2005/0289447 A1 | 12/2005 | Hadley et al. | |
| 2008/0128334 A1 * | 6/2008 | Scott et al. | 209/309 |
| 2008/0294723 A1 | 11/2008 | Daniels et al. | |
| 2010/0037095 A1 * | 2/2010 | Gerber | 714/15 |
| 2010/0191771 A1 * | 7/2010 | Jones | 707/793 |

* cited by examiner

*Primary Examiner* — Stephen S. Hong
*Assistant Examiner* — James G Pohlman
(74) *Attorney, Agent, or Firm* — Knobbe Martens Olson & Bear LLP

(57) ABSTRACT

A run-book automation system is provided having a run-book repository having one or more run-books stored thereon. The automation system can include process logic for implementing an automation workflow including one or more automated tasks. The system can also include at least one invokable run-book document comprising procedural information related to the workflow and comprising at least one actionable link. The system may also include a run-book process module configured to initiate execution of the process logic of a first run-book and to provide the run-book document for display to a user. The system can include an automation engine in communication with the run-book process module and configured to initiate at least a first automated task of the one or more the automated tasks in response to user selection of the at least one actionable link.

20 Claims, 8 Drawing Sheets

RUN-BOOK AUTOMATION PLATFORM WITH ACTIONABLE DOCUMENT

RELATED APPLICATION

This application claims the benefit of priority under 35 U.S.C. §119(e) of U.S. Provisional Patent Application No. 61/269,836, filed on Jun. 29, 2009, and entitled "Method and System for Executable Knowledge Collaboration and Process Automation," the disclosure of which is hereby incorporated by reference in its entirety.

FIELD OF THE DISCLOSURE

The disclosure relates generally to information technology operations support systems, and particularly to knowledge management, automation and business process management systems.

BACKGROUND

Knowledge management and document systems are commonly used in areas such as Information Technology (IT) and Operations Support System (OSS) as a method to record procedures and best practices for resolving repetitive problems and accomplishing repetitive tasks. The success of knowledge management systems is often limited by the significant resources devoted to maintaining knowledge management information. This can be particularly true in a constantly changing IT environment in which new technologies and a constantly growing user base test the demand of presently available solutions.

Thus, it is beneficial for organizations to efficiently manage knowledge capture and process execution. For example, activities such as problem diagnosis and remediation, customer inquiry response, etc., often consume significant organizational resources. This is true in a wide variety of contexts including information technology (IT), network, or other resource management, service provisioning and/or activation (e.g., for cable, Internet, or other telecommunications services), customer management, responding to customer service inquiries, billing procedures, and the like. One challenge that faces organizations is effectively capturing and utilizing organizational knowledge and expertise so as to deliver services in a cost effective manner.

SUMMARY OF CERTAIN INVENTIVE ASPECTS

Run-book automation (RBA) tools can be used to generally define, build, orchestrate, manage and report on workflows that support system and network operational processes. For example, run-book processes can cross management disciplines and interact with different types of infrastructure elements, such as applications, databases and hardware.

This disclosure describes, among other features, systems and methods for providing a run-book automation platform for defining and/or automating workflows associated with service delivery. Advantageously, in certain embodiments, the run-books include interactive documents (e.g., wikis) having embedded actionable links and displayable to a user. The actionable links can be selectable by a user to execute certain workflow tasks. Thus, the run-book documents according to some aspects provide an integrated resource for navigating the run-book workflow to troubleshoot problems or provide other desired services.

In another aspect, documents can include embedded results information related to one or more completed automated tasks. This provides an integrated process automation architecture in which personnel can dynamically respond to automation results in order to efficiently execute the run-book and deliver the desired service. Moreover, the results information can be parsed and presented to users in the run-book documents in an intuitive manner such that the run-book documents can be leveraged by less experienced users.

Additionally, the disclosure describes a collaborative run-book automation platform in which subject matter experts can capture and document their knowledge and experience in collaboratively in the run-books, allowing these experts to arrive at and straightforwardly capture consensus on standardized procedures. The collaborative nature of certain embodiments of the run-book automation platform allows subject matter experts to adapt to constantly changing technology (e.g., changes in IT infrastructure).

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

In certain aspects a run-book automation (RBA) system is provided including a run-book repository having one or more run-books stored thereon. The run-books can include process logic for implementing an automation workflow including one or more automated tasks, and, in certain embodiments, at least one invokable run-book document comprising procedural information related to the workflow and comprising at least one actionable link. In certain embodiments, the RBA system comprises a run-book process module executable on at least one processor and configured to initiate execution of the process logic of a first run-book of the one or more run-books. The run-book process module can be further configured to provide the run-book document corresponding to the first run-book for display to a user, the at least one actionable link of the run-book document selectable by the user. The RBA system can further comprise an automation engine is executable on the at least one processor and in communication with the run-book process module and configured to initiate at least a first automated task of the one or more the automated tasks in response to user selection of the at least one actionable link.

The run-book process module can further be configured to dynamically populate embedded results information associated with the first automated task into the run-book document. In some embodiments, the run-book process module is further configured to, upon subsequent execution of the first automated task, cause the run-book process module to dynamically update the embedded results information. In certain embodiments, the run-book process module is configured provide the run-book document for display on a mobile device of the user.

In some aspects, the run-book process module is configured to cause a request to be sent to a mobile device of a second user prior to execution of the at least one automated task, such that the second user can respond to the request using the mobile device, and wherein the run-book process module is further configured to delay initiation of the first automated task at least until receipt of a response to the request from the mobile device. For example, the request is one or more of an authorization request, an user-input request, a request to complete a manual task, and a request for task completion confirmation.

According to some embodiments, the run-book process module is configured to dynamically determine whether to provide the run-book document for display to the user at least in part in response to the results of the first automated task.

The first automated task can be associated with a device that is physically remote from the run-book automation system. In some configurations, the first automated task causes a diagnostic test to be run on the device. An event monitoring tool monitoring the device can detect an event associated with the device, and generates a service request in response to the event, and, in such embodiments, the run-book process module can be configured to initiate execution of the process logic of the first run-book in response to the service request.

In certain embodiments, at least a portion of the procedural information is associated with the first automated task and the at least one actionable link. At least a portion of the procedural information comprises information instructing the user how to perform a manual task in some embodiments.

According to some aspects, the run-book process module is further configured to dynamically determine at least a portion of the content of the run-book document for display to the user. For example, the dynamic determination at least in part in response to the results of the at least one automated task, or, in some cases, at least in part in response to contextual information.

At least one of the one or more run-book documents can comprise collaborative content, such as a wiki, for example.

In some embodiments, the run-book process module is further configured to dynamically select a second run-book of the one or more run-books for execution at least in part in response to one or more of the results of the first automated task and a role of the user.

According to another aspect of the disclosure, a method of providing a run-book automation workflow is provided. The method can comprise, loading a first run-book for execution. The run-books can comprise process logic for implementing an automation workflow including one or more automated tasks and at least one invokable run-book document comprising procedural information related to the workflow and comprising at least one actionable link. In certain embodiments, the method includes initiating, using at least one processor, execution of the process logic of the first run-book. The method can further include providing the run-book document of the first run-book for display to a user and, in some embodiments, receiving user selection of the at least one actionable link. In response to user selection of the at least one actionable link, the method can include, using the at least one processor, initiating execution of at least a first automated task of the one or more automated tasks.

The method can further comprise dynamically populating embedded results information associated with the first automated task into the run-book document. In certain embodiments, the method comprises dynamically updating the embedded results information upon subsequent execution of the first automated task via user selection of the at least one actionable link. In some embodiments, the method includes dynamically determining whether to provide the run-book document for display to the user at least in part in response to the results of the first automated task.

The method can include dynamically determining at least a portion of the content of the run-book document for display to the user. The dynamic determination can be at least in part in response to the results of the first automated task, for example, or at least in part in response to contextual information.

The method can further include dynamically selecting a second run-book of the one or more run-books for execution at least in part in response to one or more of the results of the first automated task and a role of the user.

In certain embodiments, the method comprises receiving collaborative input associated with the first run-book document from at least two users.

BRIEF DESCRIPTION OF THE DRAWINGS

Throughout the drawings, reference numbers can be re-used to indicate correspondence between referenced elements. The drawings are provided to illustrate embodiments of the inventions described herein and not to limit the scope thereof.

DETAILED DESCRIPTION

For purposes of illustration, the systems and methods are described herein primarily in select example contexts including IT diagnostic and remediation automation and telecommunication service provisioning and activation. However, the run-book automation platform described herein is not limited to these contexts and can be used in a variety of other contexts, such as business process automation, workflow automation, work force automation, enterprise application integration and job scheduling.

Overview

Figure 1:
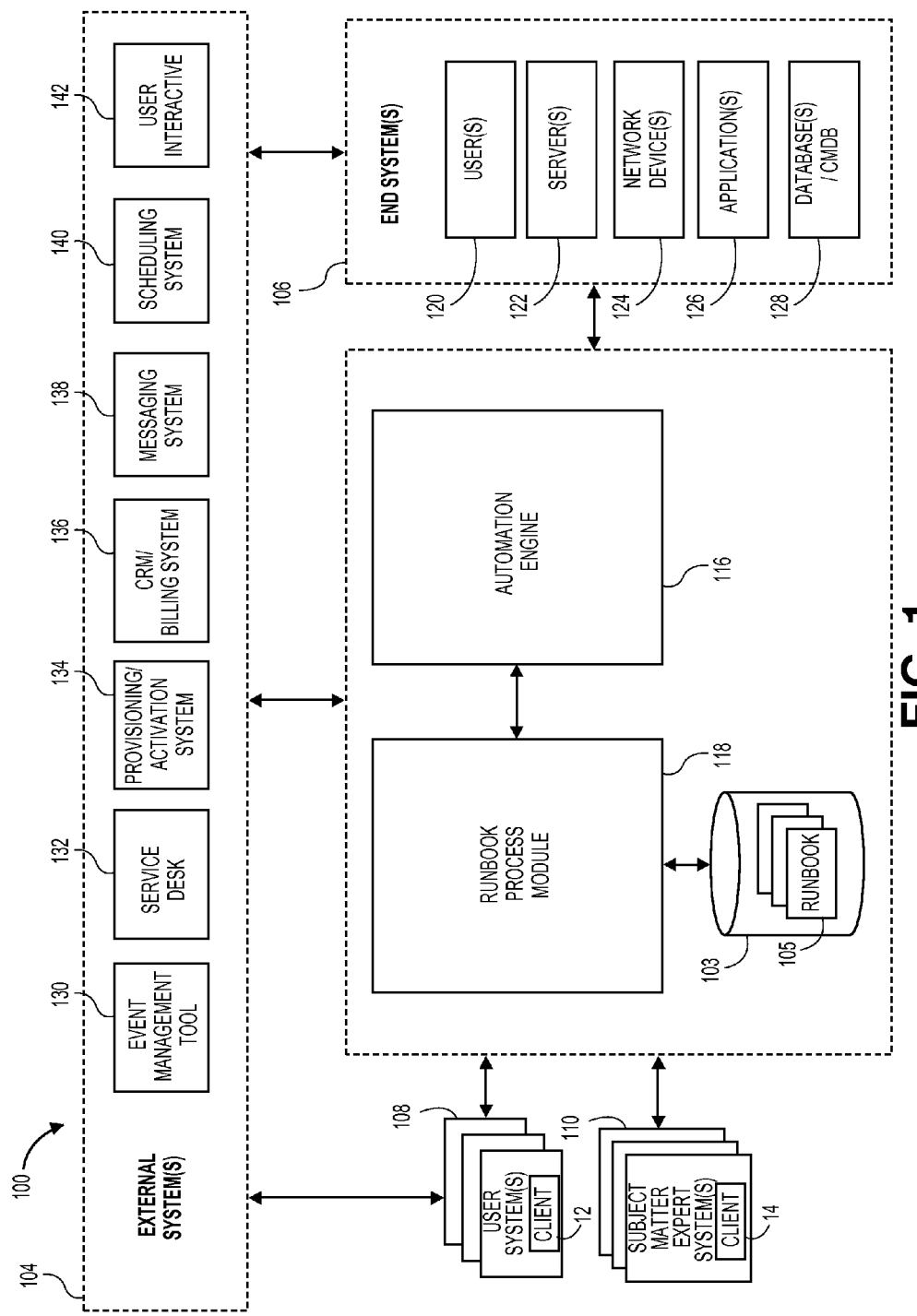
FIG. 1 illustrates a block diagram of an automation environment including an embodiment of a run-book automation system.

FIG. 1 illustrates an example automation environment 100 including an embodiment of a run-book automation (RBA) system 102 and one or more external systems 104 in communication with the RBA system 102. In addition, the automation environment 100 can optionally include one or more end system(s) 106 in communication with the external system(s) 104, the RBA system 102, or both. The RBA system 102 and/or external system(s) can also be in communication with at least one user system 108 and at least one subject matter expert (SME) system 110.

As will be appreciated, the RBA system 102, external system(s) 104, end system(s) 106, user system 108, subject matter expert system 110, or a subset or components thereof can be implemented in one or more machines, such as physical computer systems comprising hardware and/or software. Additionally, the various systems 102, 104, 106, 108, 110 can comprise or be installed on one or more physically separate machines, and can be distributed over a network, such as a LAN, WLAN (e.g., Wi-Fi), WAN, the Internet, or the like. For example, the various systems 102, 104, 106, 108, 110 may be physically remote from one another in various embodiments and operate over wireless networks. In some alternative embodiments, one or more of the systems may reside on the same machine. For example, in one embodiment, the user system 108 and the RBA system 102 reside on the same computer. In some embodiments, one or more of the user system 108, the external system 104, and the end system(s) are the same system or may reside on the same machine.

In the illustrated embodiment, the user system 108 and the SME system 110 respectively include clients 112, 114 allowing user interacting with the RBA system 102 and, optionally, with one or more of the external system(s) 104. For example, the clients 112, 114 may be web-browsers or other applications running on the user system 108 or the SME system 110.

As shown, the RBA system 102 can include an automation engine 116 and a run-book process module 118 in communication with one another. Additionally, the RBA system 102 can include a run-book repository 103 storing one or more run-books 105. The run-book repository 103 may comprise a storage device such a hard-drive or other computer memory, for example. As will be described in greater detail, the RBA system 102 generally responds to service requests from the external system(s) 104 by invoking the appropriate pre-configured run-book 105.

Each of the run-books 105 can include process logic and at least one run-book document. The process logic includes procedural steps defining the automation flow for responding to the service request or otherwise executing the run-book to provide the desired automation result. For example, the process logic can include sequences of tasks and logic for dynamically responding to events that occur during the run-book execution, such as user input and results from previous tasks, for example.

In various embodiments, execution of the run-books and associated procedures can be automatically initiated by the external system(s) 104 (e.g., by a service request to the RBA system 102), by users (e.g., on an as needed basis), and/or on a scheduled basis.

As part of the run-book 105 execution, the RBA system 102 often provides the user with the interactive run-book 105 document. Advantageously, the run-book document may include actionable, user-selectable links and/or embedded automation results. Additionally, the run-book documents can include dynamically generated content. The run-book documents are described in greater detail herein, with respect to FIGS. 2-5, for example.

While shown as separate components for the purposes of illustration, the automation engine 116 and run-book process module 118 of some embodiments may be an integral component (e.g., form part of the same software application). Additionally, functions described as being performed by the automation engine 116 may be performed by the run-book process module 118 and vice versa in some configurations.

Figure 2A:
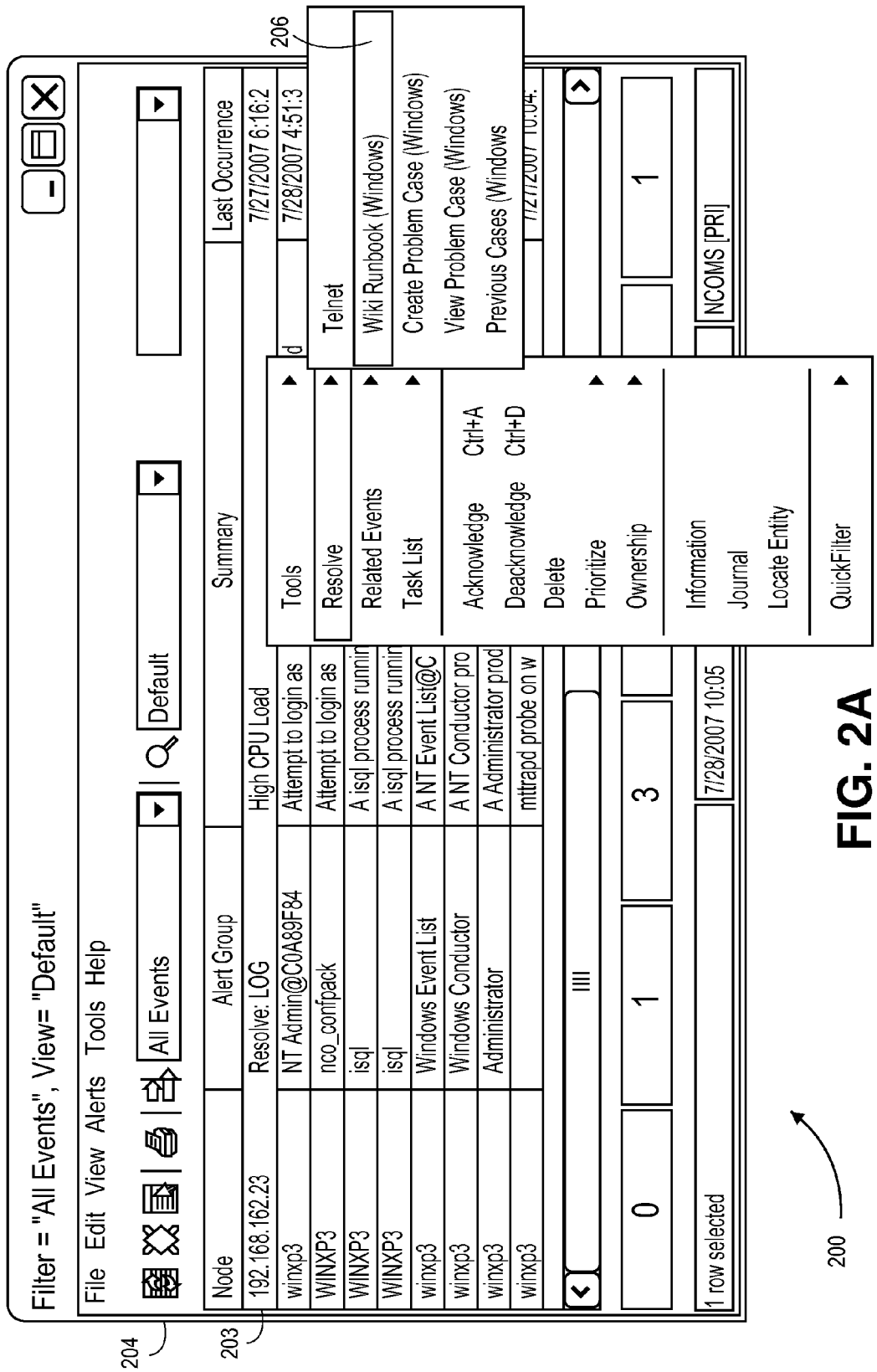
FIGS. 2A-2C illustrate an example sequence of screen displays presented to a user as the user interacts with an embodiment of a run-book automation system.
Figure 2B:
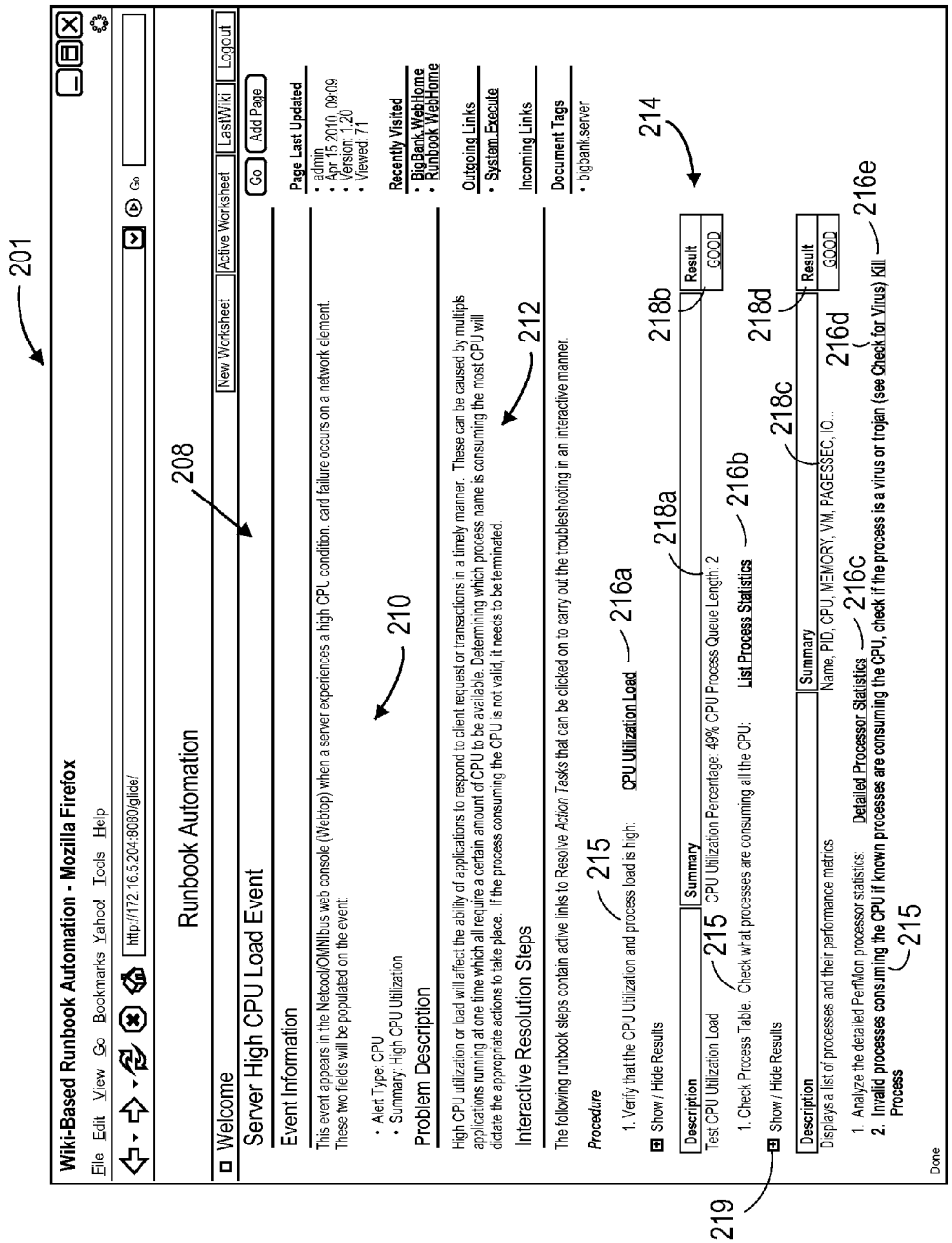
Figure 2C:
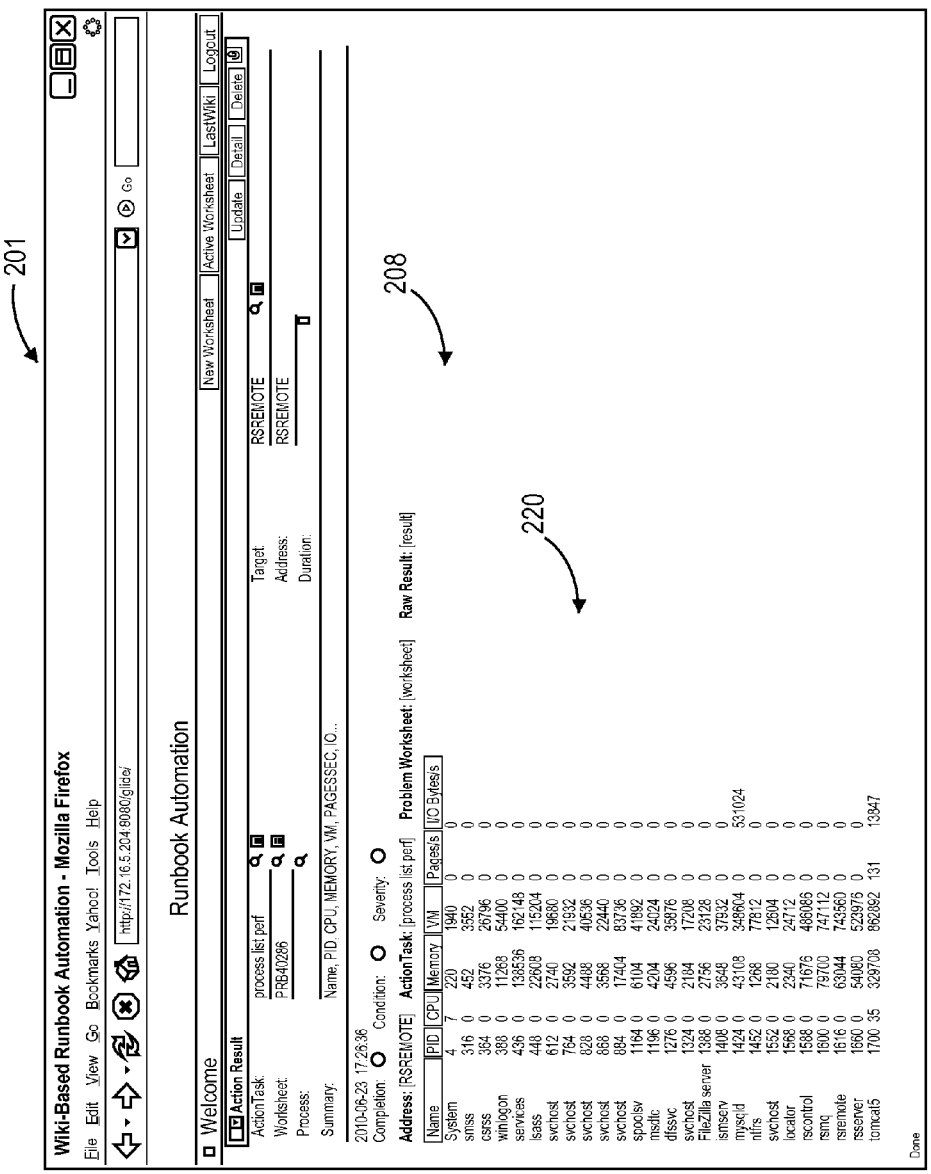
Figure 3A:
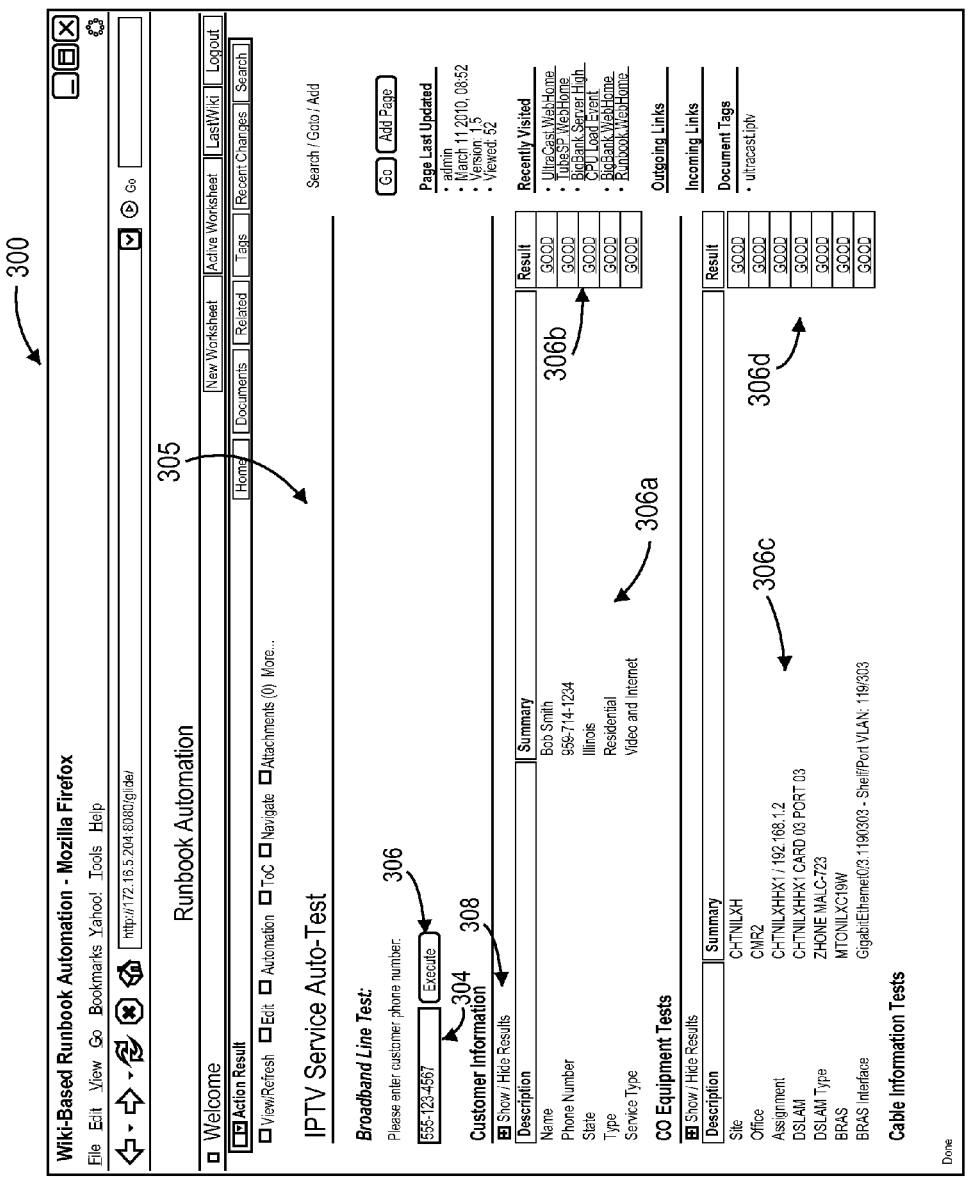
FIGS. 3A-3B illustrate an example sequence of screen displays presented to a user as the user interacts with another embodiment of a run-book automation system.
Figure 3B:
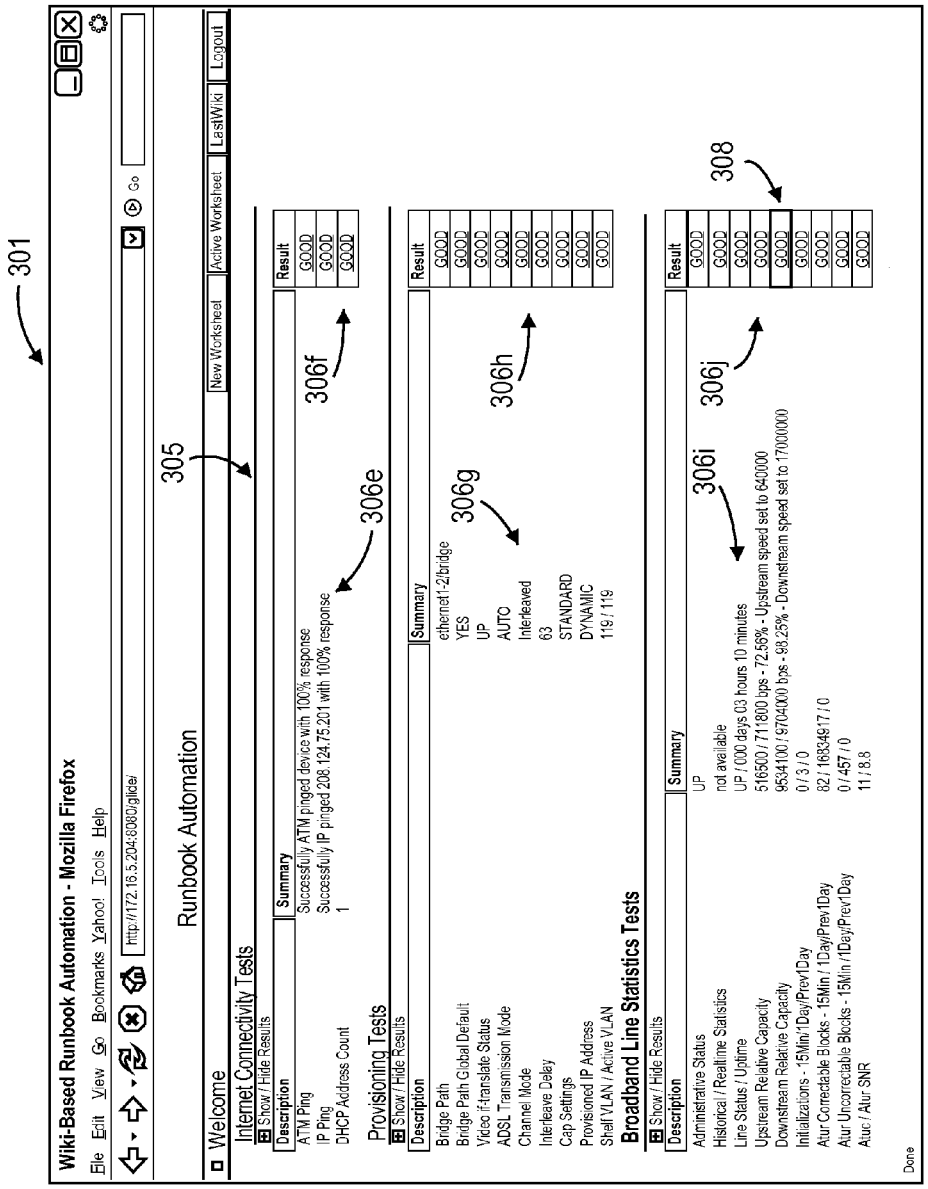

The end system(s) 106 can include, without limitation, one or more users 120, servers 122 (or another computing device, such as a personal computer), network devices 124, applications 126 (e.g., software applications running on the servers), databases 128 (e.g., a configuration management database (CMDB)), and the like. For example, in some embodiments, the end systems 106 form the IT infrastructure of a company or other organization. As will be described in further detail, depending on the service requested by the external system 104, the RBA system 102 in certain embodiments interacts with the end systems 106 as part of the automation process. For example, FIGS. 2A-C illustrate a scenario wherein an example RBA system 102 interacts with a server 122 in a troubleshooting situation in which a high CPU load condition is detected on a computing device 122. FIGS. 3A-C illustrate a scenario where the RBA system 102 interacts with networking devices 124 at a customer's home to perform automated testing of the Internet Protocol Television (IPTV) service delivered to the customer.

As shown, depending on the application, the external system(s) 104 can include a variety of entities, and can generally include any entity capable of initiating service requests to the RBA system 102. For example, the external system 104 can include an event management tool 130, which may also be referred to as operations management or monitoring software. The event management tool 120 may generally provide service management for data centers, network operations, IT infrastructure, and the like. Example event management tools 120 are IBM Tivoli® NetCool® OMNIbus and BMC Event and Impact Manager, although others may be used.

With further reference to FIG. 1, the external system(s) 104 can optionally a service desk 132. For example, the service desk may be capable of receiving customer calls or other requests and initiating a service request in response, such as to resolve a service problem the customer is having. In various embodiments, the service desk 132 may include an individual such as a customer service representative and/or a system running a service desk software application. Example service desk software applications that may be used include IBM Tivoli® SRM, BMC Remedy Service Desk, CA Service Desk from CA Technologies, and Clarify, for example.

Another example of an external system is a provisioning/activation system 134. In certain embodiments, the provisioning/activation system 134 is generally capable of preparing and/or equipping an infrastructure to allow it to provide services to customers or other users. For example, such systems may provision new services to existing customers, or provision an initial set of services to new users. Example provisioning systems may include Oracle Metasolv, Tervela® TPM Provisioning & Management System™, Spirent's React™, among others. Example services may include cable services, network services (e.g., T1 line activation), Video-on-Demand, Internet Protocol Television, cellular services, and the like.

Another type of external system 104 is a billing management system 136, which may manage electronic customer billing and/or commerce. An example of such a system is Siebel eBilling software.

Yet another example type of external system 104 is a messaging system 138. Example messaging systems capable of initiating service requests to the RBA system 102 include Microsoft Exchange, IBM Lotus, or systems compatible with various email and text messaging protocols such as Post Office Protocol (POP) or Short Messaging Service (SMS).

Run-book automation may also be initiated on a scheduled basis. For example, run-books may be executed from a scheduler (not shown) that runs on the RBA system 104 in some embodiments. In other embodiments, the RBA system 102 is integrated with an external system 104 such as a scheduling system 140. The scheduling system 140 may include a job scheduler, for example, which invokes one or more run-books 105 on a scheduled basis. For example, in one embodiment, a run-book 105 is scheduled to perform an automated health check of critical end systems 106 (e.g., IT systems) on a periodic basis.

Run-book automation may also be initiated by end-users. For example, certain procedures within a particular run-book automation workflow may be user-initiated. For example, user-initiated input can be entered by users and received by the RBA system 102 via an interface running on the user system 108. Additionally, user-initiated input may be entered via a user interactive 142 interface running on an external system 104. The user-interactive 142 interface may run on any of the types of systems 130, 132, 134, 136, 138, 140 shown, or on some other external system 104 in various embodiments. The interface can comprise a GUI, command line, or other appropriate interface, for example.

Depending on the situation, the RBA system 102 can select and display an appropriate run-book procedure for user-initiation and display via the user interactive 142 interface (or interface provided on the user system 108). The user interactive 142 interface may also be capable of allowing automated tasks or sub-run-books to be executed on demand. Depending on the run-book 105, user-initiated tasks may include tasks where human involvement is desired in the decision making process. For example in a High CPU Load diagnostic run-book, such as the one described below with respect to FIGS. 2A-2C, a user-initiated automated step in the run-book procedure may include executing a task to kill or restart the process and/or restart the server.

While certain example external systems 104 have been provided, a wide variety of other types of systems capable of initiating service requests may be used such as, for example, ticketing systems, network testing systems (e.g., NetAnalyst, Adtran 3000), application server systems (e.g., WebSphere, WebLogic, Citrix, JBOSS, Tomcat), customer relationship management (CRM) systems, and the like.

Example Automation Scenarios

FIGS. 2A-C illustrate an example sequence of screen displays 200-202 presented to a user as the user interacts with an example RBA system 102 in a troubleshooting scenario. In the example scenario, the external system 104 includes an event management system 130 monitoring the operation of one or more computing devices, such as one or more servers 122 of IT infrastructure 106 of a company.

In the example scenario, the event management system 130 detects a "High CPU Load" condition on a server 122 of the IT infrastructure 106, as indicated by entry 203 in the event monitoring window 204 depicted in FIG. 2A. The event monitoring window 204 may be a GUI provided to the user by a client of the event management system 130 running on the user system 108, for example. In response, the event management system 130 transmits a service request to the automation RBA system 102 requesting diagnosis and/or remediation of the detected high-CPU load.

The automation engine 116 receives the service request and causes the run-book process module 118 to select and load an appropriate run-book 105. While other techniques are possible, in one embodiment, the RBA system 102 stores a table or other data structure associating each type of detected condition or service request with a particular run-book 105, and consults the table to select the appropriate run-book 105.

Once the appropriate run-book is selected, the run-book process module 118 begins execution of the run-book. In the example scenario, according to the process logic of the run-book, the run-book process module 118 causes the automation engine 116 to initiate three automated tasks as a first step in the run-book execution. The three tasks are "CPU Utilization Load," "List Process Statistics," and "Detailed Processor Statistics." Execution of each of these tasks causes the automation engine 116 to interact with the server 122. In response, the server 122 executes commands locally so as to generate reporting information related to the utilization of the CPU of the server 122.

Upon being alerted to or otherwise noticing the entry 203 in the event window 204 indicating the high CPU load event, the user decides to invoke the run-book document to diagnose and remedy the problem. As such, the user right-clicks the entry 202, and navigates to and selects the "Wiki Runbook" link. In response, the run-book process module 118 provides the run-book document 208 for display to the user, as shown in the screen display 201 of FIG. 2B. For example, the screen displays 201-202 are displayed to the user on a client 112 (e.g., web browser) running on the user system 108.

As shown, the run-book document 208 includes a variety of content including an Event Information section 210 providing general information related to the event triggered by the event management system 130. The run-book document 208 further provides a Problem Description section 212 generally describing the detected problem, possible effects of the problem, etc.

Additionally, an interactive portion 214 (under the heading "Interactive Resolution Steps") including procedural information 215 for diagnosing and remedying the problem. Advantageously, the interactive portion 214 includes actionable links 216a-216d which can be associated with certain procedural information. The actionable links 216a-216d are selectable by the user to cause the automation engine to initiate execution of the associated tasks. For example, the user can select actionable link 216a to check the CPU utilization load, link 216b to obtain a list of process statistics, link 216c to obtain a more detailed list of process statistics, or link 216d to cause the server to run a program to check for a virus.

As shown, the actionable links 216a-216d are embedded in the document and can be juxtaposed with the relevant procedural information 215. For example, the user can read the relevant diagnostic or remedial procedure (e.g., "Verify that the CPU Utilization and process load is high"), and then click on the appropriate link to execute the procedure. This provides the user with an integrated and intuitive resource to step through the automation procedure in a cost effective manner. For example, the user can perform diagnosis and remediation through a single interactive resource, streamlining the automation.

In contrast, when using conventional methods the user may consult or interact with multiple resources (e.g., multiple documents and/or individuals) to determine the correct diagnostic or remedial steps. Moreover, without the actionable links 216a-216d, the user may need to interact with multiple interfaces and/or applications in order to execute the appropriate tasks according to conventional techniques. Moreover, the actionable links 216a-216d allow for repeatable re-use of knowledge, reducing user-errors.

In various embodiments, the actionable links can be positioned generally next to the corresponding procedural information, as shown, embedded in the procedural information (e.g., the procedural text may be a selectable hyperlink), or arranged in some other manner such that they are intuitively selectable. Moreover, the actionable links may comprise any selectable item including, without limitation, hyper-links, graphical buttons, items selectable from drop-down menus, etc.

Additionally, the run-book process module 216 is configured to dynamically populate embedded results information 218a-218d associated with the run-book tasks into the run-book document 208. As shown, the summary results information 218a, 218c provides a summary description of the results for the respective process (e.g., "CPU Utilization Percentage: 49% CPU Process Queue Length: 2"). Moreover, the results information 218b, 218d can include pass/fail type information related to the respective tasks. For example, the results information 218b, 218d each display the word "GOOD," showing that the results of the "CPU Utilization Load" and the "List Process Statistics" tasks indicate proper operation of the functionality of the server 122 that is tested by the respective tasks.

Referring still to FIG. 2B, the results information 218b, 218d can include selectable links allowing the user to access expanded results information. For example, referring now to FIG. 2C, the run-book process module 218 provides the user with the expanded results 220 shown in the screen display 202 when the user clicks on the expandable "Show/Hide Results" button 219 associated with the "Check Process Table" task.

Moreover, the run-book process module 218 can be configured to dynamically update the results information 218a-218d upon subsequent execution of a task, such as through execution of a task using one of the actionable links 216a-216e.

For example, as discussed, in the example scenario, the tasks RBA system 102 automatically executed the tasks associated with links 216a, 216b and 216c ("CPU Utilization Load," "List Process Statistics," and "Detailed Processor Statistics") upon initial execution of the run-book 215, prior to when the user accesses of the run-book document 208. Thus, when the user 208 eventually accesses the run-book document 208, a significant period of time may have elapsed since the initial execution of the tasks. The results information 218a-218d may therefore be outdated when the user initially accesses the run-book document 208. In such a case, the user may re-execute one or more of the tasks using the links 216a, 216b, 216c to verify that the problem still exists or is still resolved (e.g., the results are still "GOOD"), depending on the scenario.

Providing embedded results information 218a-218d in the run-book document 208 provides a number of advantages. For instance, the user can review the results in real-time, such as after execution of a process using an actionable link 216l-216e. Moreover, the user can respond to the results information in an intuitive manner to work through the run-book in an efficient manner. For example, the user can review the results information after completing one run-book task and, based on the results, take the appropriate action. For example, the user can click on the appropriate actionable link 216a-216e depending on the embedded results information 218a-218d. Moreover, similar to the actionable links 216a-216e, and in part due to the dynamic embedded results 218a-218d, the run-book document 208 provides the user a single integrated resource to conduct the automation procedure efficiently.

The run-book document 208 may provide procedures for performing one or more manual tasks in addition to the automated tasks described above. For example, in one embodiment, the "Kill Process" hyperlink 218e may direct a user to a portion of the run-book document 208 including procedures for manually re-booting the server. Thus, RBA systems 102 described herein generally enable fully-automated run-book task execution, execution of user-initiated (e.g., via actionable links 216a-216d) automated tasks, and execution of manual tasks.

FIGS. 3A-3B illustrate an example sequence of screen displays 300-301 presented to a user he or she interacts with the RBA system 102. The RBA system 102 in the example scenario interacts with networking devices 124 at a customer's home to perform automated testing of Internet Protocol Television (IPTV) service delivered to the customer. In the example scenario, the external system 104 may include a service desk 132, for example. While the service desk 132 may comprise service desk software in some other embodiments, in the example scenario a customer service representative at the service desk 132 receives a call from a customer regarding their IPTV service. The customer service representative at the service desk 132 is also the user in this example, and the external system 104 and user system 108 are thus the same entity.

Upon receiving the call, the user sends a service request from the user system 108 (e.g., the customer representatives computer, which is also the service desk 132 in this example) to the RBA system 102 to test the customer's IPTV service. For example, the user may use a browser running on their computer to browse to the run-book document 305 illustrated in the screen display 300 of FIG. 3A. The user then enters the customer's phone number into the entry field 304. Upon clicking the actionable link 306 ("EXECUTE" button), the run-book process module 318 causes the automation engine 316 to initiate execution of a series of tasks to test the customer's IPTV service. For example, a first task (or series of tasks) may retrieve customer information. Summary embedded results information 306a, 306b is dynamically populated into the run-book document 305. Additionally, expanded results information can be accessed using the expansion button 308, if desired.

Referring to FIGS. 3A and 3B, in the example scenario, selection of the actionable link 306 also causes one or more CO Equipment Tests, Cable information Tests, Internet Connectivity Tests, Provisioning Tests and Broadband Line Statistics Tests. Corresponding results information 306c-306i is dynamically populated in the run-book document 305. As shown, all of the tests show a "GOOD" or passing result, except for the Downstream Relative Capacity entry of the Broadband Line Statistics Tests, which shows a "CRITICAL" status.

In one embodiment, the "CRITICAL" entry 308 is selectable by the user to diagnose and remedy the identified problem. For example, the run-book 105 can be configured to provide an updated content (e.g., on a separate page or section (not shown)) of the run-book document when the user clicks on the "CRITICAL" entry 308. The second page may include procedures for diagnosing and remedying the problem, and may advantageously include actionable links and/or embedded results information as described herein. In one embodiment, once the user goes through the steps provided on the second page of diagnosing and/or remedying the problem, the run-book document redirects the user to the first page of the run-book document shown in FIGS. 3A-3C, so that the user can verify that each of the tests show a passing (e.g., "GOOD") status before determining that the problem has been resolved.

Notably, the various tests in the example scenario may cause the automation engine 116 to interact with different external systems 104 and/or end systems 106. For example, the automation engine 116 may interact with a customer database 128 at the company facility to retrieve the customer information. In contrast, one or more of the other tests cause the automation engine 116 to interact with network devices (e.g., routers, cabling, hubs, etc.) at the customer's home or at various points in the network between the IPTV service source and the home of the customer. The Provisioning Tests, on the other hand, may cause the automation engine 116 to interact with the provisioning system 134 in one embodiment. As such, the run-book unifies the automation process by providing integration with a wide variety of platforms.

Example Processes

Figure 4:
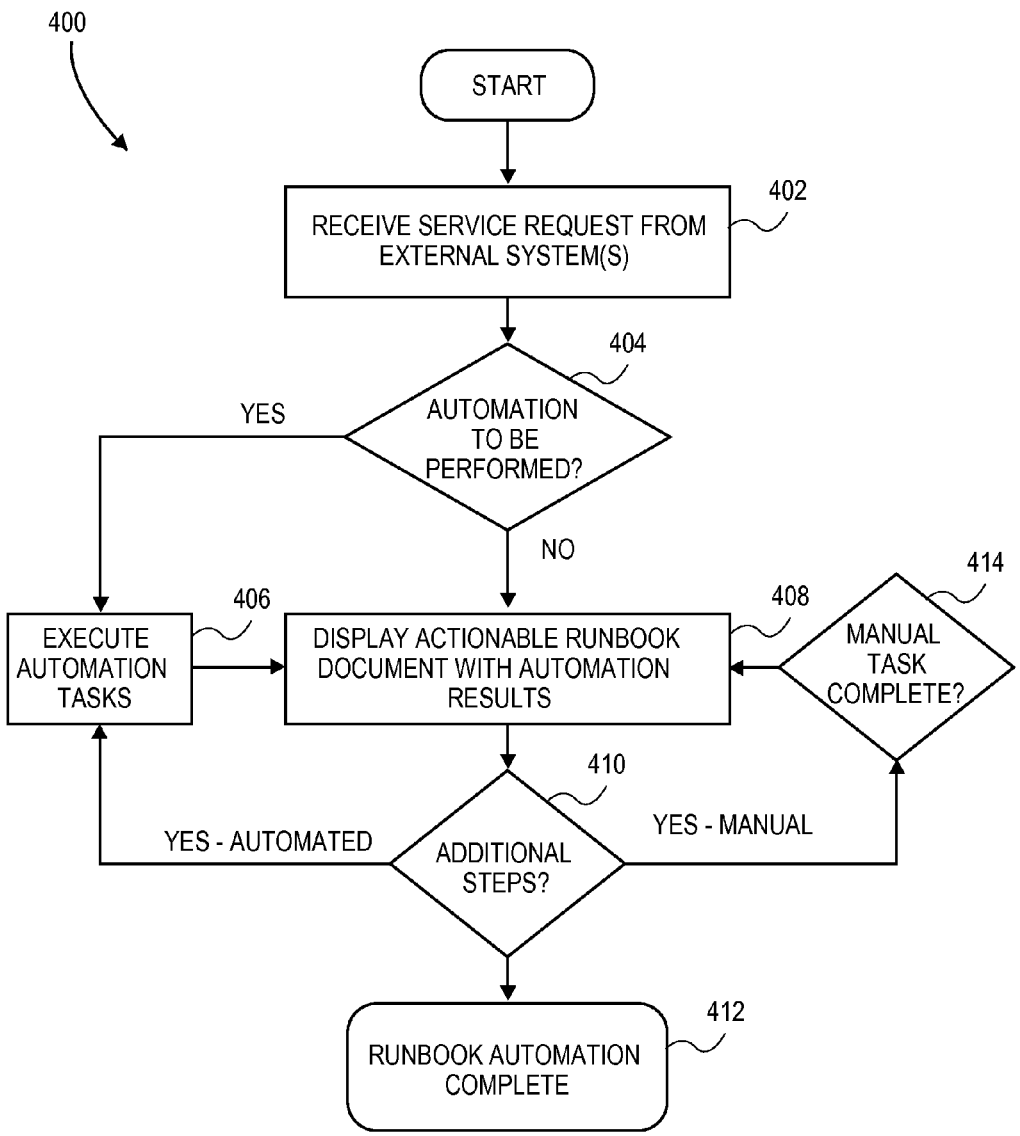
FIGS. 4-5 illustrate flowcharts of embodiments of processes for executing one or more tasks using run-book automation.
Figure 5:
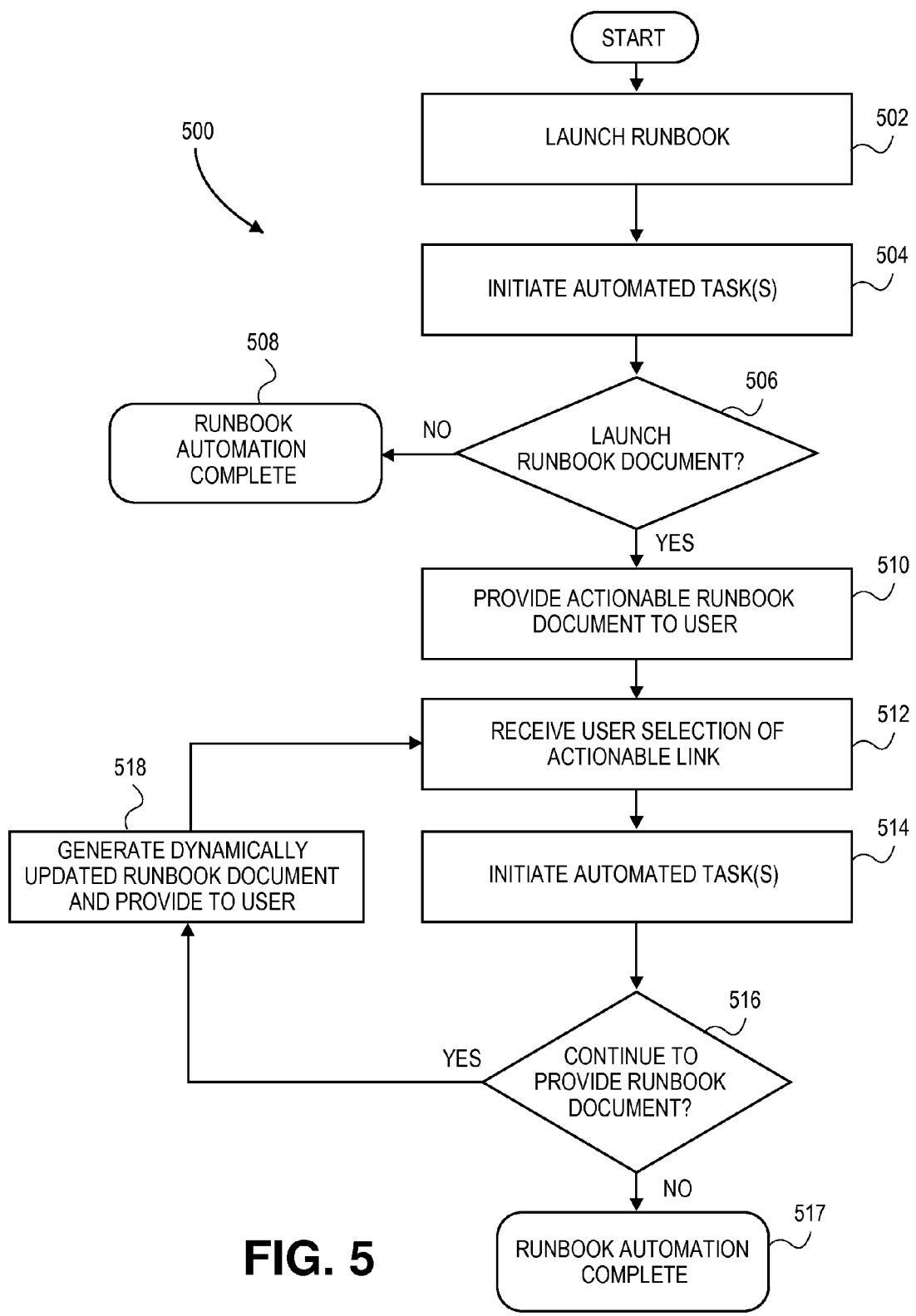

FIGS. 4-5 illustrate flowcharts of embodiments of processes 400, 500 for executing one or more tasks using run-book automation. The processes 400, 500 can be implemented by the RBA system 102 described above, and are compatible with the screen displays discussed with respect to FIGS. 2A-2C and FIGS. 3A-B.

Referring to FIG. 4, at block 402, according to certain embodiments, the run-book automation system 102 receives a service request from an external system 104. For example, the external system 104 may be an event management tool 130 as discussed above, or the user system 108. According to various embodiments, the request can be triggered in response to an event detected by the external system 104, can be scheduled, or may be triggered in response to a user invocation of the RBA system 102. The RBA system 102 may also load and begin execution of the appropriate run-book 105 in response to the request.

At decision block 404, in an embodiment, the RBA system 102 determines whether one or more automated tasks should be performed according to the process logic of the selected run-book 105. If so, the automation engine 116 causes the execution of the automated tasks at block 406. Referring to the embodiment of FIGS. 2A-2C, for example, the automation engine 116 causes the execution of the "High CPU Load" task in addition to other tasks upon receiving the request.

Referring again to FIG. 4, at block 408 the run-book process module 118 provides the run-book document for display to the user. For example if it was determined that no initial automation should be performed at block 404, the process 400 continues to block 408. Alternatively, upon execution of the automated tasks at block 406, the process 400 continues to block 408. Advantageously, the run-book document of certain embodiments can include one or more actionable links as discussed herein. Moreover, the run-book document can include embedded result information, such as result information related to the automated tasks performed at block 406.

At block 410, the run-book process module 118 may determine if additional steps should be performed according to the process logic of the run-book 105. If no additional steps should be performed, the run-book automation is complete, as indicated by block 412. For example, the requested service or problem associated with the service request may have been resolved through execution of the run-book 105. In another case, the process 400 may move to block 412 when the user exits out of the RBA system 102.

If additional steps should be performed, the run-book process module may determine which type of task (or tasks) is to be performed. If the task is automated, the process may execute the task at block 406. For example, the RBA system 102 may receive user selection of an actionable link at block 410, indicating that an automated task should be performed. In other cases, the RBA system 102 may automatically trigger execution of an automated task at block 410 based on the process logic of the run-book 105, the results of earlier completed tasks, and/or other factors.

If, on the other hand, the subsequent additional steps to be performed in the run-book process are manual tasks, the RBA system 102 determines whether the manual task is complete at block 414. For example, the run-book document may provide the user the steps involved in executing the manual task, and following execution of the steps by the user, RBA system 102 is notified of completion of the manual task. The notification can take place in a variety of manners. For example, the RBA system 102 confirms with the user that they are performing a manual task by emailing the task request to the user. Once the task has completed, the user replies to the email and includes any relevant information associated with the task back to the RBA system 102. In other configurations, the RBA system 102 polls the relevant system to determine if the manual task is complete. For example, the RBA system 102 may poll a server 122 to be re-booted manually, and exit block 414 upon detecting the re-boot. While a broad variety of manual tasks are possible, as another example manual task, a user in an IT context may be prompted by the RBA system 102 to install and set up a server computer on a server rack.

Upon completion of the manual task at block 412 the RBA system 102 again displays the run-book document at block 408, which may advantageously include one or more actionable links and/or embedded results information.

Referring now to FIG. 5 the process 500 can advantageously dynamically determine the run-book document flow and contents provided to the user. For example, the process 500 dynamically determines whether to provide the run-book document to the user in certain embodiments. Additionally, the process 500 in some embodiments determines the content to provide in the run-book document. The process 500 launches an appropriate run-book 105 at block 502 (e.g., in response to a service request, a scheduled event, user invocation, etc.).

In certain embodiments, the RBA system 102 may additionally determine a role of the user at block 502. For example, users may be assigned different levels of authorization, different subject matter or employee categories, etc., based on their subject matter expertise, position in the relevant organization, and the like.

At block 504, depending on the process logic of the run-book 105, the RBA system 102 executes one or more initial automated tasks. In some other embodiments, where the process logic of the run-book 105 does not define that automated tasks should be performed at this stage, block 504 is not included.

At block 506, the RBA system 102 according to some embodiments determines whether to launch a run-book document. For example, depending on the run-book 105, the determination may be in response to results of the initial automated tasks. In other cases, the run-book document may be invoked by the user, or is automatically displayed according to the process logic of the run-book 105. If the RBA system 102 determines that the run-book document is not to be displayed to the user, the RBA system 102 may determine that automation is complete at block 508. For example, the RBA system 102 may determine that the initial tasks performed at block 504 resolved the detected issue. In some cases, however, such as where the user can invoke the run-book document, the RBA system 102 may continue to wait for user input without exiting.

If the run-book document is to be displayed to the user, at block 510 the RBA system 102 provides the run-book document to the user, which can include one or more actionable links as described herein. Where initial automated tasks have taken place at block 504, the run-book document may additionally provide embedded results information as described above, such as with respect to the scenario of FIGS. 2A-2C.

At block 512, the RBA system 102 receives user selection of an actionable link associated with one or more automated tasks. In response, the RBA system 102 initiates the automated tasks for execution.

At block 516, the RBA system 102 according to some embodiments determines whether to continue to provide the run-book document for display to the user. For example, depending on the run-book, the determination may be in response to results of the automated tasks performed at block 514, or the process logic of the run-book 105 may dictate that the run-book document continue to be displayed or not displayed. If the RBA system 102 determines that the run-book document is not to be displayed to the user, the RBA system 102 may determine that automation is complete at block 517.

If the RBA system 102 determines that the run-book document should continue to be displayed, the RBA system 102 according to some embodiments generates the run-book document and provides it for display to the user at block 518. In certain embodiments, the run-book document displayed at either of blocks 510 and 518 may advantageously include dynamically updated content. For example, the RBA system 102 may advantageously select at least a portion of the content of the run-book document for display to the user based on automation results, contextual information, user input, or other appropriate information, or the role of the user.

While a wide variety of contextual information may be used, as just one illustrative example, if a run-book is launched that is configured to diagnose a downed server, the RBA system 102 may determine the appropriate procedural content to display to the user based on contextual information such as the type or location of the server, the organization that the server belongs to, the date or time of day, or any other appropriate information known or gathered by the RBA system 102. For example, if the downed server is located within a particular network of an organization's IT infrastructure, the RBA system 102 may provide the user with a set of procedural content appropriate to the specific situation.

Additionally, the RBA system 102 may utilize results information to determine the dynamic run-book content. As one example, if a high memory usage is detected on a monitored server and the results of an initial diagnostic automation task indicate that the process on the server is malfunctioning, the RBA system 102 may provide the user with procedures for killing the process. On the other hand, if the results of initial automation task indicate that no processes are malfunctioning, the RBA system 102 may provide the user with information or procedures for increasing the memory capacity of the particular server.

User input may also be used by the RBA system 102 to dynamically determine run-book content. For example, if a run-book 105 is launched to diagnose a particular problem, the RBA system may prompt the user for input at some point in the automation process. Such input may include information known to the user, authorization to proceed with a particular operation, selection of one of a set of courses of action to remedy a problem, etc. Upon receiving the user's response, the RBA system 102 may dynamically determine updated run-book document content. For example, if the user selects a first of a set of possible courses of action to remedy the problem, the RBA system 102 may update the run-book document to provide the user with procedural content relevant to the selected course of action.

In a similar manner, at least a portion of the contents of the run-book document may be dynamically determined by the RBA system 102 based on the role (e.g., authorization level, employee category, etc.) of the user. For example, in an IT context, if a user has a first authorization level indicating that the user is authorized to re-boot servers, a first actionable procedure for re-booting a server may be provided to the user in the run-book document. If the user has a second, authorization level indicating that the user is not authorized to re-boot servers, one or more different actionable procedures or procedural text instructing the user to contact authorized personnel may be provided in the run-book document. By determining what content is displayed based on a user's role, the RBA system 102 provides a customized experience, displaying information relevant to the user(s) currently interacting with the system. This technique can also enhance security by providing authorized content only to the appropriate personnel.

In addition to making dynamic determinations in the context of executing a single run-book (e.g., of content within a run-book document), the RBA system 102 can further dynamically select one or more other run-books 105 to provide access to, or can automatically execute one or more subsequent run-books from the run-book repository 103. Such a determination can be made using any of the information described above, including, for example, automation results from execution of the first run-book, contextual information, user input, or other appropriate information, or the role of the user. Depending on the context, the RBA system 102 may automatically execute the subsequent run-book(s), or may provide access to the subsequent run-book(s) through the run-book document of the first run-book (e.g., by providing a link that is selectable to initiate execution of a second run-book).

For example, in one scenario, the RBA system 102 loads and executes a first run-book in response to a request received from a service desk system 132. For example, the request is generated by the service desk system 132 in response to a customer inquiry regarding cable television service quality. A customer service representative interacts with the RBA system 102 (e.g., via a client 112 running on the user system 108) to perform the workflow automation associated with a first selected run-book designed to resolve the customer inquiry. Towards the end of the process, the RBA system 102, according to the logic of the first run-book, via the corresponding run-book document, prompts the representative to ask the customer if they would like to activate cable internet service in addition to television service. The customer agrees to do so, and the representative clicks on a link provided by the RBA system 102 selectable to execute a second run-book. The second run-book includes a series of routines and associated document for activating internet service at the customer's home.

The processes 400 and 500 of FIG. 4 and FIG. 5 have been described separately for the purposes of illustration. However, in certain embodiments, certain advantages and capabilities described with respect to the process 400 of FIG. 4 can be provided by the process 500 of FIG. 5, and vice versa.

Collaboration

According to certain embodiments, the run-book documents and/or process logic of the run-books can be created in a collaborative manner. Referring again to FIG. 1, for example, one or more subject matter experts (SMEs) can collaboratively create and edit run-book documents and/or process logic of the run-books 105 using the SME systems 110.

In certain embodiments, the run-book documents can comprise a collaborative document, editable by multiple authorized users. For example, the run-book documents 208, 305 of FIGS. 2B-C and 3A-B are collaborative web-accessible wikis, although other types of documents can be used, such as Microsoft Word documents, and the like.

The collaborative nature of the RBA system 102 enables subject matter experts to efficiently capture and document their knowledge and experiences, and come to consensus on standardized procedures. Additionally, through collaboration, the RBA system 102 allows users to adapt to constantly evolving situations, such as where IT infrastructure changes due to technological development, thereby keeping the knowledge captured in the run-books up-to-date.

Additionally, the RBA system 102 can in some embodiments provide users the ability to interact with one another in various other social media contexts. For example, in one embodiment the RBA system 102 allows users to vote on or rank run-books 105. As one example, each run-book may prompt a user to provide comments or other feedback (e.g., "Would not recommend," "Recommend," "Highly recommend," etc.) regarding the quality of the run-book 105 at the end of the automation process. Such embodiments can provide a number of advantages, including providing users with the ability to identify industry best-practice run-books 105.

Mobile Implementations/Run-Book Initiated Interactions

The systems and methods described herein may be used in a mobile computing environment, and can operate over wireless networks (e.g., Wi-Fi, 3G, 4G, etc.) in certain embodiments. For example, referring again to FIG. 1, one or more of the user system 108 and the SME system 114 may be a portable computer, such as a laptop or notebook, or a cellular capable device, such as a smartphone (e.g., an iPhone, Blackberry or a device running the Google Android operating system) or personal digital assistant (PDA).

In one embodiment, the user system 108 comprises a smartphone, and the client 112 comprises an application running on the smartphone allowing the user(s) to interact with the RBA system 102. For example, the application may be downloadable by the user (e.g., from the Apple App Store). In such embodiments, a plurality of users may interact with the RBA system 102 to orchestrate completion of the run-book 105 automation.

For example, the RBA system 102 can be configured to cause a request to be sent to a mobile device of a user. In some embodiments, the information requests are sent prior to execution of one or more automated run-book tasks, such that the user can respond to the request using the mobile device. The type of request can depend on the situation, and can include an authorization request requesting authorization from qualified personnel (e.g., management, subject-matter experts, etc.) for performing a particular automated task. As another example, a request for input from the user may be made, such as for input into a GUI form provided to the user on the mobile device. In one embodiment, the RBA system 102 sends a request to the user's mobile device to complete a manual task. As yet another example, requests may be made to the user to confirm that certain tasks (e.g., manual tasks) have been completed.

In some embodiments, the RBA system 102 is configured to delay initiation of one or more of automated tasks at least until receipt of a response to the request from the mobile device. In other cases, depending on the run-book, for example, the RBA system 102 may continue to execute the run-book 105 while awaiting a response from the user.

As an illustrative scenario, a cable service provider implements an RBA system 102, and a customer service representative of the cable service provider interacts with an RBA client 112 (e.g., a browser) running on a computer at a company facility. The representative receives a customer call requesting cable service activation for a new customer. An appropriate run-book may be loaded to fulfill the service activation request. However, a problem occurs at some point in the automated activation process, and an automated diagnostic test indicates that the activation of the cable service was unsuccessful.

The cable service provider may have a fleet of technicians deployed in the field who have RBA clients 112 running on smartphone devices. In one embodiment, the run-book is configured to send out a request to one or more of the technicians to visit the customer's home in order to resolve the problem. For example, the RBA system 102 may cause an email or other message to be sent to the smartphones of the technicians. The email may include a special attachment that invokes the RBA client 112 on the smartphone, although other techniques may be used. In another configuration, the client 112 is already running on the smartphone, and the request is received and processed directly by the client 112, alerting the technician to the request. In response, one of the technicians physically visits the customer's home to manually diagnose and/or remedy the problem. Once the technician diagnoses or remedies the problem, they can notify the RBA system 102 (e.g., via email, message, or other means). Alternatively, the RBA system 102 may be continuously monitoring the cable service and automatically detect proper operation. In either case, the RBA system 102 may then continue to execute the run-book procedure to completion.

In another embodiment, certain run-books include process logic that is configured to cause the RBA system 102 to request authorization or other information and input from certain users (e.g., subject matter experts, management, customers, etc.) as part of the run-book process. For example, in an IT context, the RBA system 102 may send an authorization request to an RBA client 112 running on a smartphone of an IT manager before initiating a task (e.g., re-booting a server, killing a process, etc.). The IT manager can respond via the RBA client 112 running on the smartphone by either providing the authorization or denying the request. Upon receipt of the response, the RBA system 102 continues the automation process accordingly. As another example, the RBA system 102 may prompt the IT manager via the smartphone device for other information (e.g., name, password) as part of the authorization request.

Terminology/Additional Embodiments

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a processor, controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A run-book automation system for remote testing of delivery of internet protocol television (IPTV) service to a customer, comprising:
   a run-book repository having at least a first run-book stored thereon, the first run-book comprising:
      process logic for implementing an automation workflow, the workflow including a plurality of automated tasks for remote testing of delivery of IPTV service to a customer; and
      at least one invokable run-book document comprising:
         textual information related to at least a set of automated tasks of the plurality of automated tasks; and
         at least one actionable link selectable by a user to initiate performance of at least the set of automated tasks, the set of automated tasks including:
            a first task for retrieving biographic information relating to the customer;
            a second task for remotely testing broadband remote access server (BRAS) functionality associated with the customer; and
            a third task for remotely testing capacity of a broadband internet connection associated with the customer; and
   a run-book process module executable on at least one processor and configured to:
      initiate execution of the process logic of the first run-book;
      provide the run-book document corresponding to the first run-book for display to a user via a graphical user interface (GUI), the at least one actionable link of the run-book document selectable by the user via interaction with the GUI;
      populate the run-book document with embedded results information associated with performance of the set of automated tasks, the embedded results information for each respective task of the set of automated tasks displayed in association with the textual information related to the respective task; and
      upon subsequent performance of the set of automated tasks, dynamically update the embedded results information for each respective task of the set of automated tasks,
      wherein the embedded results information is displayed within a page of the run-book document that also displays the at least one actionable link; and
   an automation engine executable on the at least one processor, in communication with the run-book process module, and configured, in response to user selection of the at least one actionable link, to initiate performance of the set of automated tasks.

2. The run-book automation system of claim 1, wherein the run-book process module is configured provide the run-book document for display on a mobile device of the user.

3. The run-book automation system of claim 1, wherein the run-book process module is further configured to cause a request to be sent to a mobile device of a second user prior to the performance of the set of automated tasks, such that the second user can respond to the request using the mobile device, and wherein the run-book process module is further configured to delay initiation of the execution of the set of automated tasks at least until receipt of a response to the request from the mobile device.

4. The run-book automation system of claim 3, wherein the request is one or more of an authorization request, a user-input request, a request to complete a manual task, and a request for task completion confirmation.

5. The run-book automation system of claim 1, wherein the run-book process module is configured to dynamically determine whether to provide the run-book document for display to the user at least in part in response to the results of one or more of the tasks in the set of automated tasks.

6. The run-book automation system of claim 1, wherein at least one task of the tasks in the set of automated tasks is associated with a device that is physically remote from the run-book automation system.

7. The run-book automation system of claim 6, wherein the at least one task causes a diagnostic test to be run on the device.

8. The run-book automation system of claim 6, wherein an event monitoring tool monitoring the device detects an event associated with the device, and generates a service request in response to the event, and wherein the run-book process module is configured to initiate execution of the process logic of the first run-book in response to the service request.

9. The run-book automation system of claim 1, wherein the page of the run-book document also displays procedural information related to one or more of the plurality of automated tasks, in addition to displaying the embedded results information and the at least one actionable link.

10. The run-book automation system of claim 1, wherein the run-book process module is further configured to dynamically determine at least a portion of the content of the run-book document for display to the user.

11. The run-book automation system of claim 10, wherein the dynamic determination at least in part in response to the results of the one or more of the tasks in the set of automated tasks.

12. The run-book automation system of claim 1, wherein run-book document of the first run-book comprises a collaborative wiki.

13. A method of providing a run-book automation workflow for remote testing of delivery of internet protocol television (IPTV) service to a customer, the method comprising:
by a computer system comprising computer hardware:
loading a first run-book for execution, the first run-book comprising:
process logic for implementing an automation workflow, the workflow including a plurality of automated tasks for remote testing of IPTV service to a customer; and
at least one invokable run-book document comprising:
textual information related to at least a set of automated tasks of the plurality of automated tasks; and
at least one actionable link selectable by a user to initiate performance of at least the set of automated tasks, the set of automated tasks including:
a first task for retrieving biographic information relating to the customer;
a second task for remotely testing broadband remote access server (BRAS) functionality associated with the customer; and
a third task for remotely testing capacity of a broadband internet connection associated with the customer; and
initiating, using at least one processor, execution of the process logic of the first run-book;
providing the run-book document of the first run-book for display to a user via a graphical user interface (GUI), the at least one actionable link of the run-book document selectable by the user via interaction with the GUI;
using the at least one processor, and in response to user selection of the at least one actionable link, initiating performance of the set of automated tasks; and
populating the run-book document with embedded results information associated with performance of the set of automated tasks, the embedded results information for each respective task of the set of automated tasks displayed in association with the textual information related to the respective task and the at least one actionable link; and
upon subsequent performance of the set of automated tasks, dynamically updating the embedded results information for each respective task of the set of automated tasks within, and without navigating away from, a page of the run-book document that initially displayed the embedded results information and the at least one actionable link.

14. The method of claim 13, further comprising dynamically determining at least a portion of the content of the run-book document for display to the user in response to one or more of results of the set of automated tasks and contextual information.

15. The method of claim 13, further comprising dynamically selecting a second run-book for execution, the dynamic selection at least in part in response to one or more of the results of the one or more automated tasks and a role of the user.

16. The method of claim 13, further comprising receiving collaborative input associated with the first run-book document from at least two users.

17. A non-transitory computer-readable storage medium comprising computer-executable program instructions configured, upon execution, to implement a method of providing a run-book automation workflow for remote testing of delivery of internet protocol television (IPTV) service to a customer, the method comprising:
loading a first run-book for execution, the first run-book comprising:
process logic for implementing an automation workflow, the workflow including a plurality of automated tasks for remote testing of IPTV service to a customer; and
at least one invokable run-book document comprising:
textual information related to at least a set of automated tasks of the one or more automated tasks; and
at least one actionable link selectable by a user to initiate performance of at least the set of automated tasks, the set of automated tasks including:
a first task for retrieving biographic information relating to the customer;
a second task for remotely testing broadband remote access server (BRAS) functionality associated with the customer; and
a third task for remotely testing capacity of a broadband internet connection associated with the customer; and
initiating, using at least one processor, execution of the process logic of the first run-book;
providing the run-book document of the first run-book for display to a user via a graphical user interface (GUI), the at least one actionable link of the run-book document selectable by the user via interaction with the GUI;
using the at least one processor, and in response to user selection of the at least one actionable link, initiating performance of the set of automated tasks; and
populating the run-book document with embedded results information associated with performance of the set of automated tasks, the embedded results information for each respective task of the set of automated tasks displayed in association with the textual information related to the respective task and the at least one actionable link; and
upon subsequent performance of the set of automated tasks, dynamically updating the embedded results information for each respective task of the set of automated tasks within, and without navigating away from, a page of the run-book document that initially displayed the embedded results information and the at least one actionable link.

18. The system of claim 1, wherein the automation engine is configured to: automatically initiate an initial performance of at least a first automated task of the set of tasks in response to a detected event; and
initiate the subsequent performance of the first automated task in response to user selection of the actionable link.

19. The method of claim 13, wherein said initiating performance comprises automatically initiating an initial performance of at least one of the set of automated tasks in response to a detected event, and wherein the method further comprises initiating the subsequent performance of the at least one of the set of automated tasks in response to user selection of the actionable link.

20. The non-transitory computer-readable storage medium of claim 17, wherein said initiating performance comprises automatically initiating an initial performance of the at least one of the set automated tasks in response to a detected event, and wherein the method further comprises initiating a subsequent performance of the at least one of the set of automated tasks in response to user selection of the actionable link.

* * * * *